United States Patent
Mizuno (10) Patent No.: US 10,659,769 B2
(45) Date of Patent: May 19, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Shogo Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 15/685,939

(22) Filed: Aug. 24, 2017

(65) Prior Publication Data

US 2018/0063514 A1  Mar. 1, 2018

(30) Foreign Application Priority Data

Sep. 1, 2016  (JP) .................................. 2016-170929

(51) Int. Cl.
  *G06T 15/00* (2011.01)
  *H04N 13/282* (2018.01)
  (Continued)

(52) U.S. Cl.
  CPC ............. *H04N 13/282* (2018.05); *G06F 3/14* (2013.01); *G06F 3/147* (2013.01); *G06T 15/20* (2013.01);
  (Continued)

(58) Field of Classification Search
  CPC ....... G06T 15/205; G06T 15/20; H04N 5/247; H04N 13/282; H04N 13/243; H04N 13/279; G06F 3/147; G06F 3/14
  (Continued)

(56) References Cited

U.S. PATENT DOCUMENTS 5,600,368 A * 2/1997 Matthews, III .... H04N 7/17318
  348/143
7,292,257 B2 * 11/2007 Kang .................... G06T 15/205
  345/419

(Continued)

FOREIGN PATENT DOCUMENTS

JP  2014215828 A  11/2014

OTHER PUBLICATIONS

Gedikli S, Bandouch J, von Hoyningen-Huene N, Kirchlechner B, Beetz M. An adaptive vision system for tracking soccer players from variable camera settings. InProceedings of the 5th Internati T, Leo M. A review of vision-based systems for soccer video analysis. Pattern recognition. Aug. 1, 2010;43(8):2911-26.*

(Continued)

*Primary Examiner* — Phu K Nguyen
(74) *Attorney, Agent, or Firm* — Canon U.S.A., Inc. IP Division (57) ABSTRACT

An image processing apparatus includes an obtaining unit configured to obtain virtual viewpoint information indicating a position and/or a direction of a virtual viewpoint corresponding to a virtual viewpoint image generated based on images captured by a plurality of cameras which capture images of a subject from different directions, and a display controller configured to display, while a first virtual viewpoint image corresponding to the virtual viewpoint information obtained by the obtaining unit is displayed on a display unit, a second virtual viewpoint image having an angle of view larger than an angle of view of the first virtual viewpoint image being displayed on the display unit, when an instruction for switching to a virtual viewpoint having a position and/or a direction which are/is not set by a user is received.

10 Claims, 9 Drawing Sheets

(51) Int. Cl.
*H04N 13/243* (2018.01)
*H04N 13/279* (2018.01)
*H04N 5/247* (2006.01)
*G06T 15/20* (2011.01)
*G06F 3/147* (2006.01)
*G06F 3/14* (2006.01)

(52) U.S. Cl.
CPC ........... *G06T 15/205* (2013.01); *H04N 5/247* (2013.01); *H04N 13/243* (2018.05); *H04N 13/279* (2018.05)

(58) Field of Classification Search
USPC .......................................................... 345/419
See application file for complete search history.

(56) References Cited

U.S. PATENT DOCUMENTS

| | | | |
|---|---|---|---|
| 8,854,457 B2 * | 10/2014 | De Vleeschouwer | G11B 27/034 348/135 |
| 9,245,389 B2 * | 1/2016 | Sako | G06F 3/011 |
| 9,449,229 B1 * | 9/2016 | Laska | G06K 9/00765 |
| 9,600,723 B1 * | 3/2017 | Pantofaru | H04N 7/181 |
| 9,898,852 B2 * | 2/2018 | Miller | G06T 15/00 |
| 10,057,562 B2 * | 8/2018 | Cabral | H04N 13/257 |
| 10,127,783 B2 * | 11/2018 | Laska | G08B 13/19682 |

OTHER PUBLICATIONS

Ren J, Orwell J, Jones GA, Xu M. Tracking the soccer ball using multiple fixed cameras. Computer Vision and Image Understanding. May 1, 2009;113(5):633-42.*

Niño-Castañeda J, Frías-Velázquez A, Bo NB, Slembrouck M, Guan J, Debard G, Vanrumste B, Tuytelaars T, Philips W. Scalable semi-automatic annotation for multi-camera person tracking. IEEE Transactions on Image Processing. May 2016;25(5):2259-74.*

Choi K, Park B, Lee S, Seo Y. Tracking the ball and players from multiple football videos. International Journal of Information Acquisition. Jun. 2006;3(02):121-9.*

* cited by examiner

IMAGE PROCESSING APPARATUS, IMAGE PROCESSING METHOD, AND STORAGE MEDIUM

BACKGROUND

Field

The present disclosure relates to an image processing apparatus, an image processing method, and a storage medium.

Description of the Related Art

In general, a technique for performing synchronization imaging based on multiple viewpoints, each of the viewpoints associated with one of a plurality of cameras disposed in different positions, and generating a virtual viewpoint image formed from, in addition to images captured from the viewpoints of the cameras, arbitrary viewpoints generated using a plurality of viewpoint images obtained by the imaging, has attracted attention. Generation and browsing of a virtual viewpoint image based on images obtained from a plurality of viewpoints may be realized by collecting images captured by a plurality of cameras in an image processor, such as a server, performing a process, such as rendering, based on a virtual viewpoint using the image processor, and displaying a virtual viewpoint image on a viewing terminal of a user.

In a service using such a virtual viewpoint image, a user may watch a game of soccer, a basketball, or the like, displayed on a terminal screen as a virtual viewpoint image. Furthermore, if the user is enabled to freely shift a viewpoint of a virtual viewpoint image using a user interface, the user may experience a you-are-there feeling as a more realistic sensation when compared with viewing general captured images. Note that a virtual viewpoint may not only be shifted by a user of a viewing terminal but may also be set by an operation of a user who uses a viewpoint setting device for setting a viewpoint, for example. In this case, a virtual viewpoint image corresponding to a virtual viewpoint set by a user operating the viewpoint setting device is displayed on at least one viewing terminal. Note that when the term "user" is used hereinafter in this disclosure, it should be understood as including both the concepts of a user of a viewing terminal capable of setting a virtual viewpoint and a user of the viewpoint setting device, unless otherwise stated.

Japanese Patent Laid-Open No. 2014-215828 discloses a technique for generating and displaying a virtual viewpoint image corresponding to an arbitrary viewpoint using images within a given range of viewpoints which are captured by a plurality of cameras arranged so as to encompass the given range.

However, in a case where a virtual viewpoint image is viewed while a viewpoint is shifted in accordance with a user operation, when a subject (for example, a player or a ball) which is focused on by the user moves quickly, the subject may move out of a frame of the viewpoint. In particular, as a viewpoint is set closer to a running player or a ball, more realistic content may be obtained. However, the subject may move out of a frame.

SUMMARY

According to an embodiment of the present disclosure, an image processing apparatus includes an obtaining unit configured to obtain virtual viewpoint information indicating a position and/or a direction of a virtual viewpoint corresponding to a virtual viewpoint image generated based on images captured by a plurality of cameras which capture images of a subject from different directions, and a display controller configured to display, while a first virtual viewpoint image corresponding to the virtual viewpoint information obtained by the obtaining unit is displayed on a display unit, a second virtual viewpoint image having an angle of view larger than an angle of view of the first virtual viewpoint image being displayed on the display unit, when an instruction for switching to a virtual viewpoint having a position and/or a direction which are/is not set by a user is received.

Further features will become apparent from the following description of exemplary embodiments with reference to the attached drawings.

DESCRIPTION OF THE EMBODIMENTS

Hereinafter, embodiments of the present technique will be described with reference to the accompanying drawings. The technique is embodied in view of the problems described above, and reduces the possibility that a user who sets a virtual viewpoint cannot see a specific subject.

First Embodiment

Figure 1:
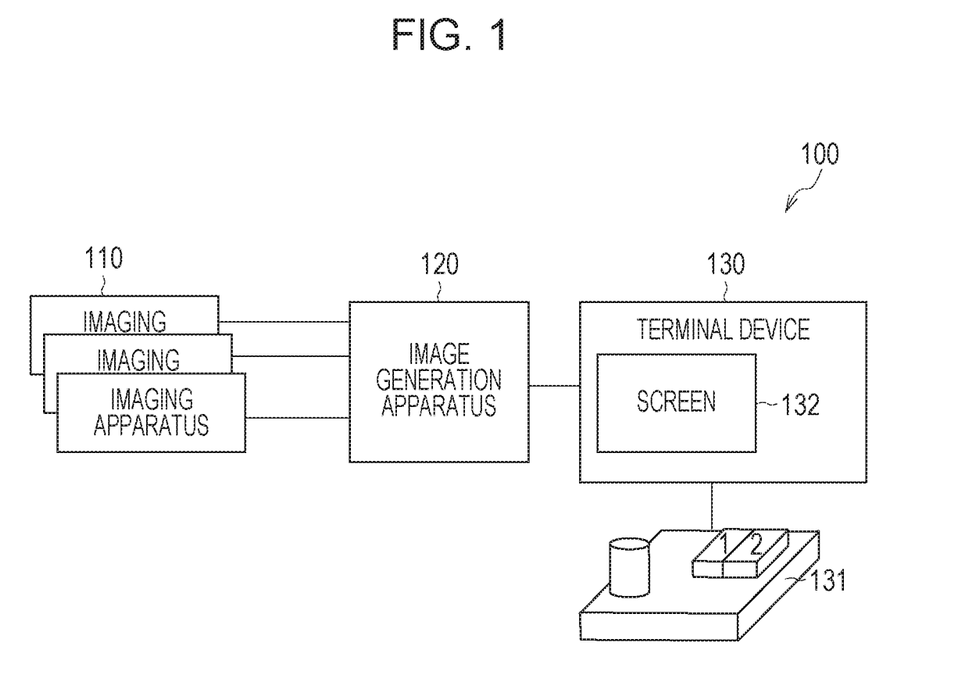
FIG. 1 is a diagram illustrating an image processing system according to one embodiment.

FIG. 1 is a diagram illustrating an image processing system 100 according to a first embodiment. The image processing system 100 includes a plurality of imaging apparatuses 110, an image generation apparatus 120, and a terminal device 130. The imaging apparatuses 110 are connected to the image generation apparatus 120 through respective communication cables, such as local area network (LAN) cables. Note that, although the communication cables are LAN cables in this embodiment, the communication cables are not limited to this embodiment. For example, the communication cables may be video transmission cables of DisplayPort, High-Definition Multimedia Interface (HDMI®), or the like.

Figure 2:
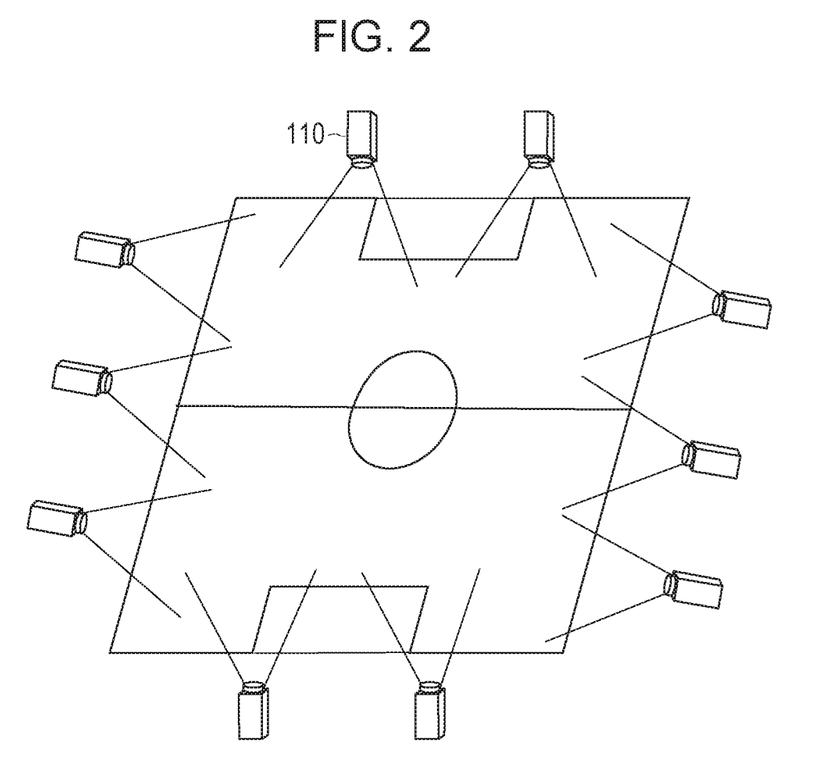
FIG. 2 is a diagram illustrating installation of imaging apparatuses according to one embodiment.

The imaging apparatuses 110 are digital still cameras capable of capturing images (still images and moving images), for example. The individual imaging apparatuses 110 are installed, for example, so as to encompass a playing field of a stadium, such as a soccer field, or a specific subject, and capture images (for example, videos). The captured images are transmitted from the imaging apparatuses 110 to the image generation apparatus 120. FIG. 2 is a diagram illustrating installation of the imaging apparatuses 110. In this embodiment, each of the imaging apparatuses 110 is installed so as to capture an image of all or a portion of a soccer field. Specifically, the image processing system 100 of this embodiment includes the plurality of imaging apparatuses 110 which capture images of the subject from a plurality of directions.

The image generation apparatus 120 stores captured images obtained by the imaging apparatuses 110 and generates a virtual viewpoint image based on the captured images and a virtual viewpoint when virtual viewpoint information is received via a user operation using the terminal device 130. Here, the virtual viewpoint information indicates a 3D position of a virtually-obtained viewpoint (a virtual viewpoint) in a virtual space constituted by the captured images. The virtual viewpoint information includes at least information regarding a position relative to a given reference position, such as a center of the captured image of the stadium. For example, the virtual viewpoint information might include information such as front, back, left, or right, relative to the given reference position, and information on a direction from the given reference position, for example, information on a direction of an angle relative to an axis of forward and backward directions, an axis of right and left directions, or an axis of upward and downward directions, of the given reference position.

The image generation apparatus 120 is a server apparatus, for example, and has a database function and an image processing function. An image of a scene of the stadium before a game is started, such as a scene in which no subjects exist, is stored in advance as background image data in the database, through the imaging apparatuses 110. Furthermore, in a scene including a subject, such as a player who is playing a game, a foreground which contains the subject is separated by image processing and stored as foreground image data. As a method for separating the foreground corresponding to the subject from the rest of the image, an object extraction image processing for extracting a difference between a foreground image and a background image is used. Note that the foreground may contain another specific person (a backup player, a coach, a referee, or the like) instead of a player who is playing a game, and may be an object having a predetermined image pattern, such as a ball or a goal. A moving body may be detected through another detection method.

It is assumed that a virtual viewpoint image corresponding to virtual viewpoint information is generated using the background image data and the foreground image data which are managed by the database. As a method for generating a virtual viewpoint image, model-based rendering (MBR) is used. When the MBR is employed, a virtual viewpoint image is generated using a 3D model generated based on a plurality of images of a subject captured from a plurality of directions. Specifically, the MBR is a technique for generating an image of a view of a scene from a virtual viewpoint utilizing a 3D shape (model) of a target scene obtained by a 3D shape restoration method, such as a visual volume intersection method or multi-view-stereo (MVS). Note that a virtual viewpoint image may be generated using a rendering method other than the MBR. The generated virtual viewpoint image is transmitted to the terminal device 130 through a LAN cable or the like.

The terminal device 130 is a personal computer (PC) or a tablet, for example. The controller 131 is a mouse, a keyboard, a six-axis controller, a touch panel, or the like. The user operates the controller 131 so as to display a still image or a moving image on a screen. The terminal device 130 displays a virtual viewpoint image received from the image generation apparatus 120 on a screen 132. The terminal device 130 receives an instruction for a movement and a direction of a virtual viewpoint in accordance with a user operation performed on the connected controller 131, generates virtual viewpoint information indicating the virtual viewpoint corresponding to the received instruction, and transmits the virtual viewpoint information to the image generation apparatus 120. Although an example in which a virtual viewpoint image generated based on a virtual viewpoint set by the terminal device 130 is displayed on the terminal device 130 is mainly described in this embodiment, the present technique is not limited to this configuration. For example, a virtual viewpoint image generated based on a virtual viewpoint set by the terminal device 130 may be displayed on another terminal device 130 (a smartphone, for example).

Figure 3:
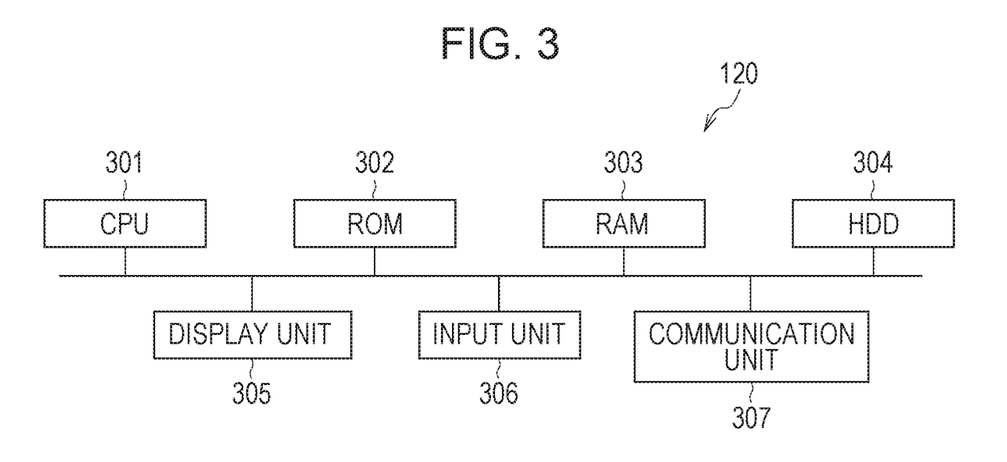
FIG. 3 is a diagram illustrating a hardware configuration of an image generation apparatus according to one embodiment.

FIG. 3 is a diagram illustrating a hardware configuration of the image generation apparatus 120. The image generation apparatus 120 includes a central processing unit (CPU) 301, a read only memory (ROM) 302, a random access memory (RAM) 303, a hard disk drive (HDD) 304, a display unit 305, an input unit 306, and a communication unit 307. The CPU 301 executes various processes by reading control programs stored in the ROM 302. The RAM 303 is used as a main memory of the CPU 301 and a temporary storage area, such as a work area. The HDD 304 stores various data, various programs, and the like. The display unit 305 displays various information. The input unit 306 includes a keyboard and a mouse and accepts various user operations. The communication unit 307 performs a process of communication with an external apparatus, such as an image forming apparatus, through a network. Examples of the network include Ethernet®. As another example, the communication unit 307 may wirelessly communicate with the external apparatus.

Note that functions and processes of the image generation apparatus 120 described below with reference to flowcharts and the like are realized when the CPU 301 reads the programs stored in the ROM 302 or the HDD 304 and executes the programs. However, part of or all the functions and processes of the image generation apparatus 120 may be realized by dedicated hardware. In this case, the functions and the processes described below are realized when the CPU 301 of the image generation apparatus 120 controls the dedicated hardware. Furthermore, a hardware configuration of the terminal device 130 is the same as that of the image generation apparatus 120. Specifically, functions and the processes of the terminal device 130 described below with reference to flowcharts and the like may be realized by the CPU 301 or part of or all the functions and the processes may be realized by dedicated hardware.

Figure 4:
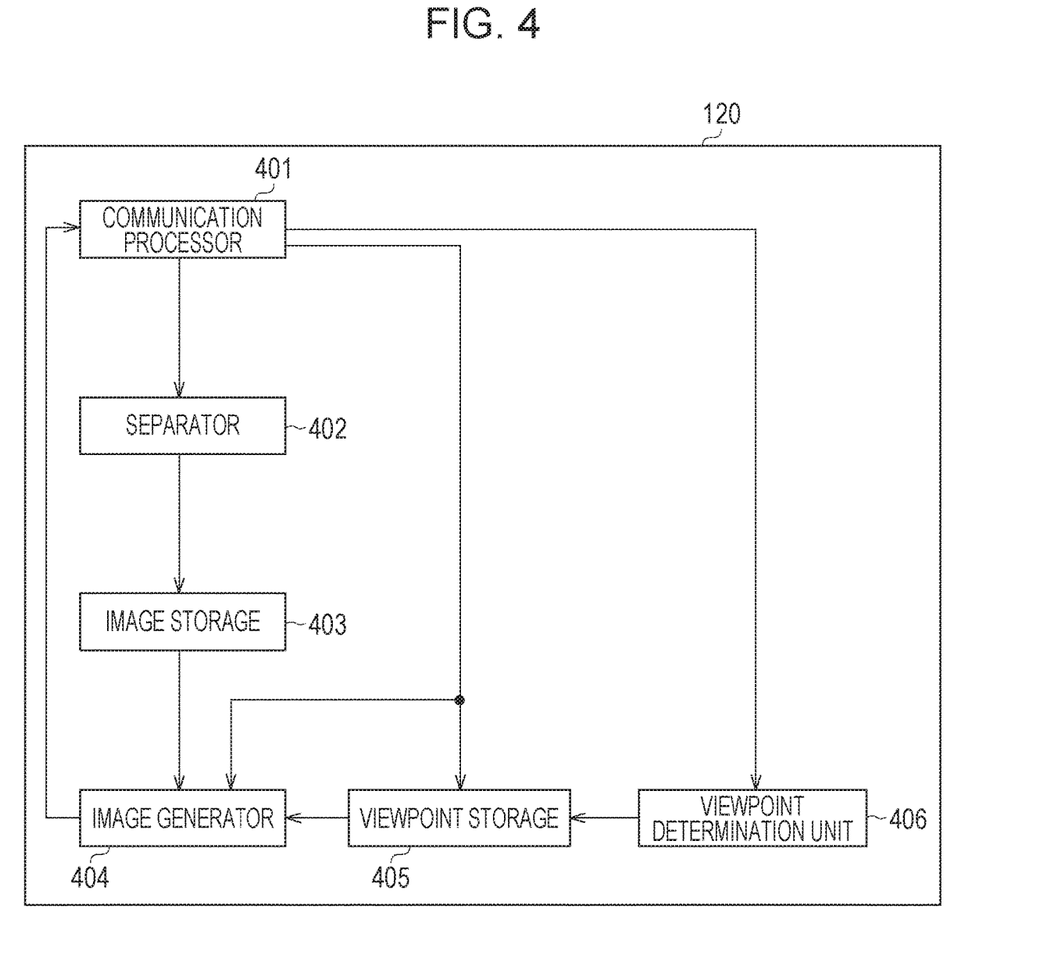
FIG. 4 is a diagram illustrating a functional configuration of the image generation apparatus according to a first embodiment.

FIG. 4 is a diagram illustrating a functional configuration of the image generation apparatus 120. The image generation apparatus 120 includes a communication processor 401, a separator 402, an image storage 403, an image generator 404, a viewpoint storage 405, and a viewpoint determination unit 406. The communication processor 401 controls transmission and reception of information between the image generation apparatus 120 and the terminal device 130. The separator 402 records, in the image storage 403 as a background image, an image obtained by capturing a scene of a stadium which does not include a specific subject, such as a scene before a game is started, among captured images received through the communication processor 401. Furthermore, the separator 402 extracts a specific subject, such as a player, from an image captured during a game and records an image of the extracted specific subject as a foreground image. The image storage 403 stores the background image and the foreground image.

The image generator 404 performs image processing of combining the foreground image and the background image stored in the image storage 403 so as to generate a virtual viewpoint image in accordance with the virtual viewpoint information received through the communication processor 401. The virtual viewpoint image is transmitted to the terminal device 130 through the communication processor 401. The viewpoint storage 405 stores virtual viewpoint information received through the communication processor 401. The viewpoint storage 405 also stores virtual viewpoint information generated by the viewpoint determination unit 406 described below.

The viewpoint determination unit 406 receives an instruction for switching a virtual viewpoint through the communication processor 401. The switching instruction is issued to instruct switching from a virtual viewpoint image corresponding to a virtual viewpoint determined by a user operation which is being displayed on the screen 132 to a virtual viewpoint image corresponding to another virtual viewpoint having the predetermined relationship with the virtual viewpoint determined by the user operation. Specifically, the switching instruction is issued for switching to a virtual viewpoint which is not specified by a user operation in terms of a position and a direction of the virtual viewpoint.

When receiving the switching instruction, the viewpoint determination unit 406 determines a position of a virtual viewpoint which is different from the virtual viewpoint corresponding to the user operation. Hereinafter, it is assumed that the virtual viewpoint determined in accordance with the user operation is referred to as a "first virtual viewpoint" and the virtual viewpoint determined by the viewpoint determination unit 406 based on the first virtual viewpoint is referred to as a "second virtual viewpoint". Information indicating the first virtual viewpoint is referred to as "first virtual viewpoint information", and information indicating the second virtual viewpoint is referred to as "second virtual viewpoint information". Furthermore, a virtual viewpoint image generated from the first virtual viewpoint is referred to as a "first virtual viewpoint image" and a virtual viewpoint image generated from the second virtual viewpoint is referred to as a "second virtual viewpoint image".

The viewpoint determination unit 406 determines a position of the second virtual viewpoint based on a position of the first virtual viewpoint. Specifically, in this embodiment, information on the relative positional relationship between the first and second virtual viewpoints is set in the HDD 304, for example. Then the viewpoint determination unit 406 determines the second virtual viewpoint using the first virtual viewpoint with reference to the relational information. The second virtual viewpoint is set such that a distance to the subject is larger than that from the first virtual viewpoint. The relational information may be set and changed in accordance with a user operation performed by the terminal device 130.

Figure 5:
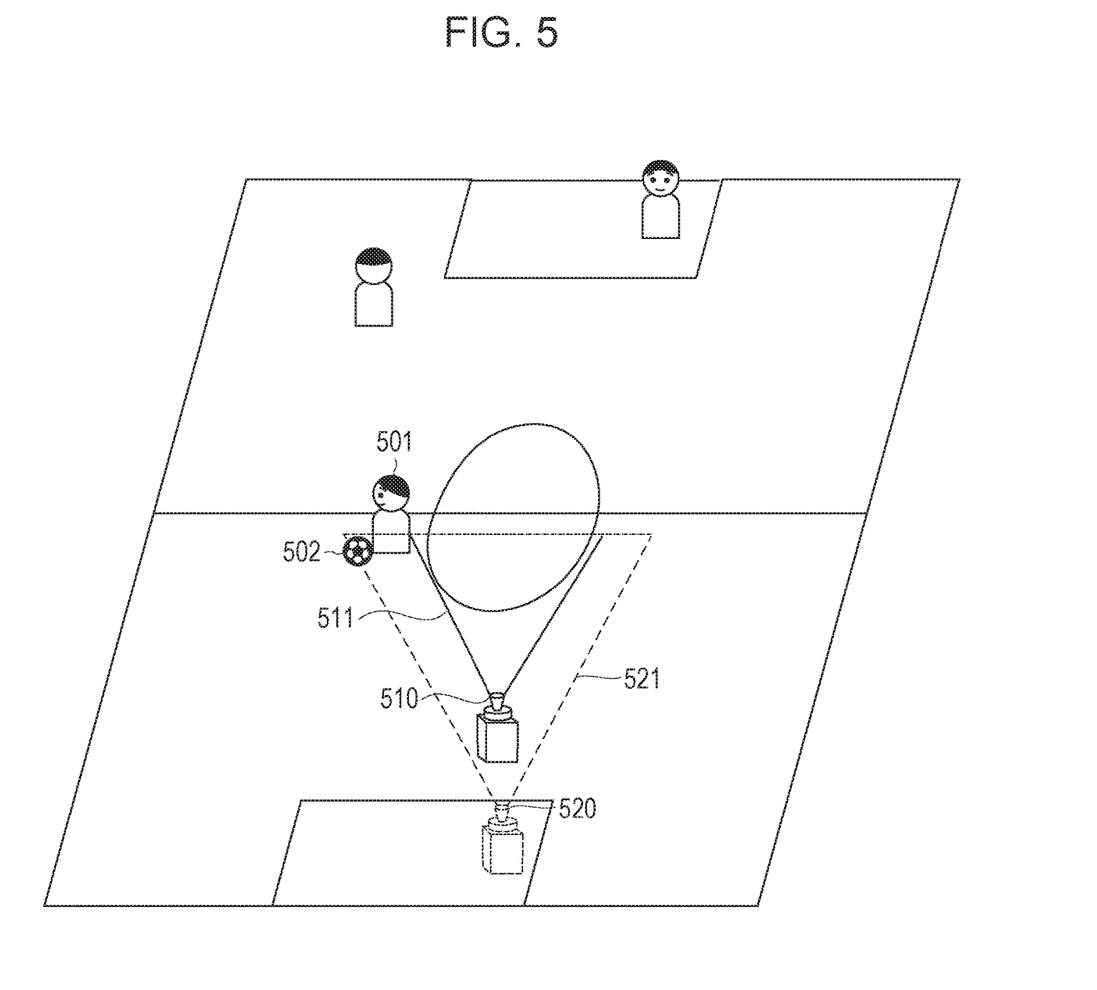
FIG. 5 is an explanatory diagram illustrating first and second virtual viewpoints according to one embodiment.

FIG. 5 is an explanatory diagram illustrating the first and second virtual viewpoints. A first range 511 is a range in which virtual imaging is performed from a first virtual viewpoint 510. A second range 521 is a range in which virtual imaging is performed from a second virtual viewpoint 520. In this way, a position of the second virtual viewpoint 520 is set such that distances from subjects 501 and 502 are longer than those from the first virtual viewpoint 510, that is, the position is in a direction opposite to a virtual imaging direction of a camera, that is, in a rear position of the camera. Accordingly, the second range 521 includes the first range 511 and is larger than the first range 511. Therefore, the second virtual viewpoint image generated by the second virtual viewpoint 520 is captured by a camera having an angle of view larger than that of the first virtual viewpoint image. Accordingly, as illustrated in FIG. 5, even in a case where the subjects 501 and 502 are about to be out of frame of the first virtual viewpoint image, the subjects 501 and 502 are included in the second virtual viewpoint image.

Figure 6:
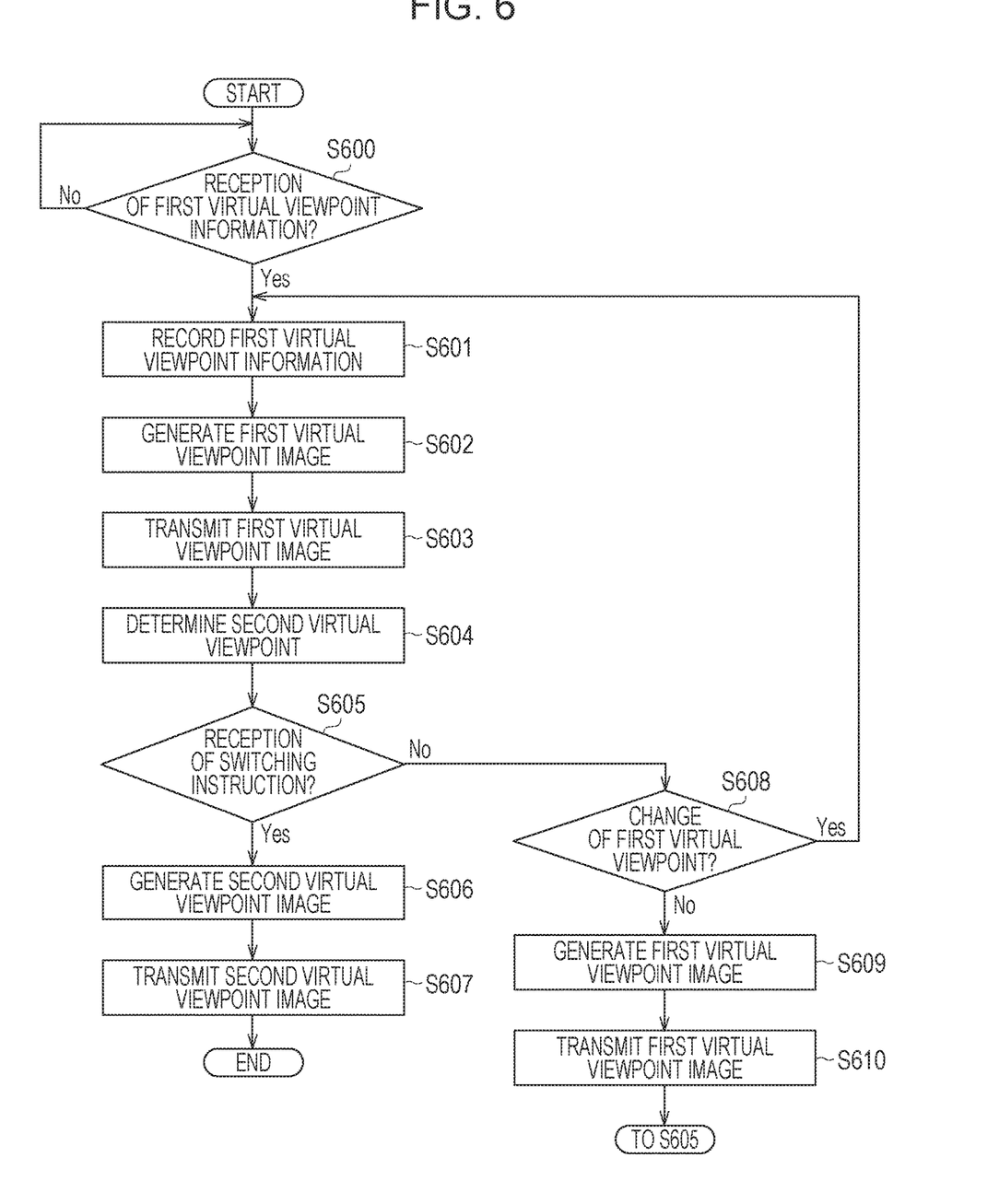
FIG. 6 is a flowchart illustrating image processing according to one embodiment.

FIG. 6 is a flowchart of the image processing performed by the image generation apparatus 120. In step S600, the communication processor 401 waits until the communication processor 401 receives first virtual viewpoint information from the terminal device 130. When receiving the first virtual viewpoint information (Yes in step S600), the communication processor 401 proceeds to step S601. Specifically, the communication processor 401 of the image generation apparatus 120 obtains virtual viewpoint information corresponding to a virtual viewpoint image generated based on images captured by a plurality of cameras which capture images of a subject from different directions from the terminal device 130. Note that, before the affirmative determination in step S600, the terminal device 130 obtains the virtual viewpoint information to be transmitted to the image generation apparatus 120. As a method for obtaining the virtual viewpoint information employed in the terminal device 130, a method based on a user operation and/or image processing may be typically used.

In step S601, the communication processor 401 records the first virtual viewpoint information in the viewpoint storage 405. In step S602, the image generator 404 combines a foreground image and a background image stored in the image storage 403 based on the first virtual viewpoint information so as to generate a first virtual viewpoint image. In step S603, the communication processor 401 transmits the first virtual viewpoint image to the terminal device 130. When receiving the first virtual viewpoint image, the terminal device 130 displays the first virtual viewpoint image on the screen 132. Here, the process in step S603 is an example of a display process for controlling display of the first virtual viewpoint image on the screen 132.

In step S604, the viewpoint determination unit 406 determines a second virtual viewpoint based on a first virtual viewpoint. In step S605, the communication processor 401 determines whether an instruction for switching of a virtual viewpoint has been supplied from the terminal device 130. When issuing the switching instruction in accordance with a user operation, the terminal device 130 transmits the switching instruction to the image generation apparatus 120. When the determination is affirmative (Yes in step S605), the communication processor 401 proceeds to step S606. When the determination is negative (No in step S605), the communication processor 401 proceeds to step S608. Note that the second virtual viewpoint may not be determined in step S604 unlike the case of FIG. 6, and may be determined after the instruction for switching of a virtual viewpoint is received, for example.

In step S606, the image generator 404 generates a second virtual viewpoint image based on the second virtual viewpoint determined in step S604. In step S607, the communication processor 401 transmits the second virtual viewpoint image to the terminal device 130. When receiving the second virtual viewpoint image, the terminal device 130 displays the second virtual viewpoint image on the screen 132. Note that the terminal device 130 may perform switching from display of the first virtual viewpoint image to display of the second virtual viewpoint image or may display both of the first and second virtual viewpoint images. Specifically, when receiving the switching instruction while the virtual viewpoint image corresponding to the virtual viewpoint information obtained in step S600 is displayed on the terminal device 130, the communication processor 401 displays a virtual viewpoint image corresponding to an angle of view which is larger than that corresponding to the virtual viewpoint image being displayed on the terminal device 130. In other words, from a viewpoint of the terminal device 130, when receiving the instruction for switching of a virtual viewpoint while the virtual viewpoint image corresponding to the virtual viewpoint information transmitted at the timing of step S600, the terminal device 130 displays a virtual viewpoint image corresponding to an angle of view larger than that corresponding to the virtual viewpoint image being displayed. Specifically, display of the screen 132 is switched from the first virtual viewpoint image to the second virtual viewpoint image. Here, the process in step S607 is an example of a display process of controlling switching of display of the screen 132 of the terminal device 130 from the first virtual viewpoint image to the second virtual viewpoint image.

A process of determining the second virtual viewpoint will now be described. The viewpoint determination unit 406 calculates the second virtual viewpoint in accordance with expressions below. Note that the expressions below are calculated to determine the positional relationship between the first and second virtual viewpoints, and the positional relationship is set in a storage, such as the HDD 304 of the image generation apparatus 120, in advance.

$Xout=Xin-(L*\sin(RYin)*\sin(RZin))$ $Yout=Yin-(L*\sin(RYin)*\cos(RZin))$ $Zout=Zin-(L*\cos(RYin))$ $RXout=RXin$ $RYout=RYin$ $RZout=RZin$ Here, "(Xin, Yin, Zin, RXin, RYin, RZin)" indicates the first virtual viewpoint and "(Xout, Yout, Zout, RXout, RYout, RZout) indicates the second virtual viewpoint. Furthermore, "L" indicates a distance between the first and second virtual viewpoints and is set in advance. Note that, from the virtual viewpoints, an X axis corresponds to a forward and backward movement, a Y axis corresponds to a right and left movement, and a Z axis corresponds to an upward and downward movement, which are expressed in metric units. Furthermore, an RX axis corresponds to rotation with an axis of a forward and backward direction, an RY axis corresponds to rotation with an axis of a right and left direction, and an RZ axis corresponds to rotation with an axis of an upward and downward direction, which are expressed in angle units. Furthermore, the correspondences between the axes and the movements or the rotation, the units of the movements or the rotation, and calculation formulas for generation of backward virtual viewpoint information are not limited to these and may be changed.

Figure 7:
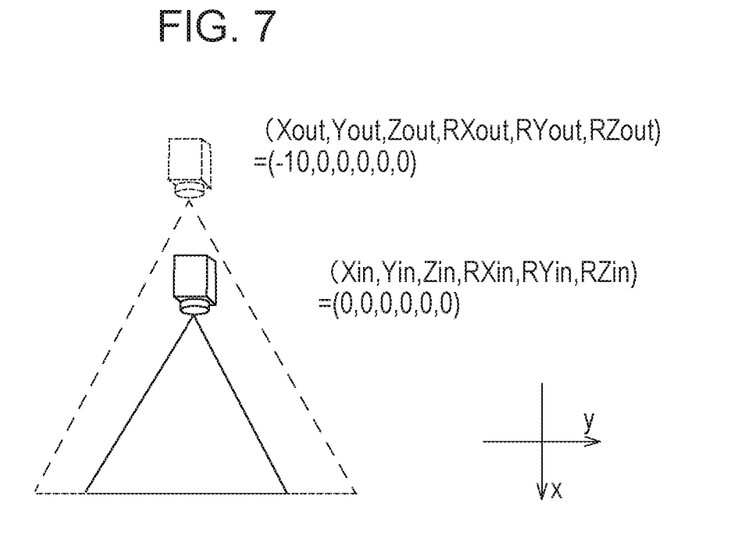
FIG. 7 is a diagram illustrating the first and second virtual viewpoints according to one embodiment.
Figure 8:
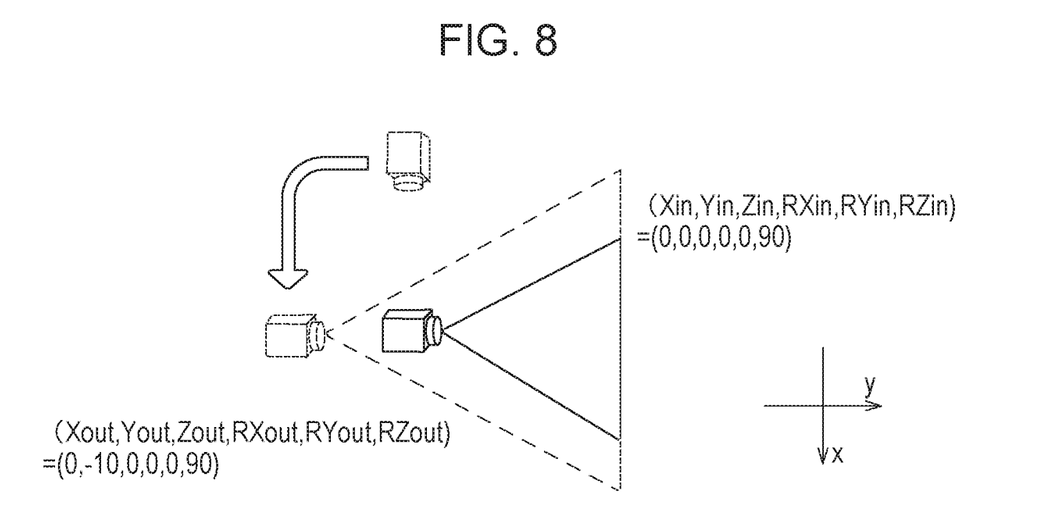
FIG. 8 is a diagram illustrating the first and second virtual viewpoints according to one embodiment.

FIGS. 7 and 8 are diagrams illustrating the first and second virtual viewpoints. It is assumed here that, as illustrated in FIG. 7, the first virtual viewpoint (Xin, Yin, Zin, RXin, RYin, RZin) is indicated by "(0, 0, 0, 0, 0, 0)". In this case, the second virtual viewpoint (Xout, Yout, Zout, RXout, RYout, RZout) is indicated by "(−10, 0, 0, 0, 0, 0)". Accordingly, the image generation apparatus 120 of this embodiment has the positional relationship between the first and second virtual viewpoints such that the second virtual viewpoint constantly follows the first virtual viewpoint so as to have an interval between the first and second virtual viewpoints of 10 meters. Specifically, according to the positional relationship of this embodiment, the second virtual position is separated from the first virtual viewpoint by a certain distance in a backward direction which is opposite to the virtual imaging direction from the first virtual viewpoint. Note that the positional relationship is determined in advance, and is not limited to the embodiment. As another example, the imaging direction may be changed within a predetermined angle.

Furthermore, it is assumed that the first virtual viewpoint revolves in accordance with a user operation as illustrated in FIG. 8. It is assumed that the first virtual viewpoint (Xin, Yin, Zin, RXin, RYin, RZin) is shifted from (0, 0, 0, 0, 0, 0) to (0, 0, 0, 0, 0, 90). In this case, the second virtual viewpoint (Xout, Yout, Zout, RXout, RYout, RZout) is shifted to (0, −10, 0, 0, 0, 90). Accordingly, even in a case where the first virtual viewpoint revolves, the second virtual viewpoint follows the first virtual viewpoint so as to have an interval between the first and second virtual viewpoints of 10 meters.

Figure 9A:
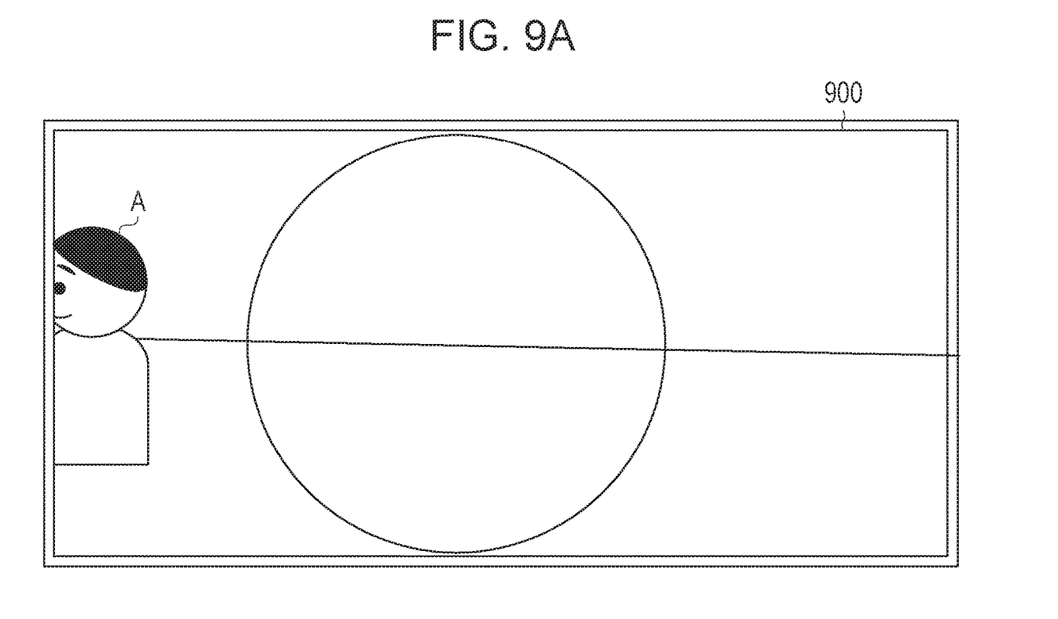
FIGS. 9A and 9B are diagrams illustrating first and second virtual viewpoint images, respectively, according to one embodiment.
Figure 9B:
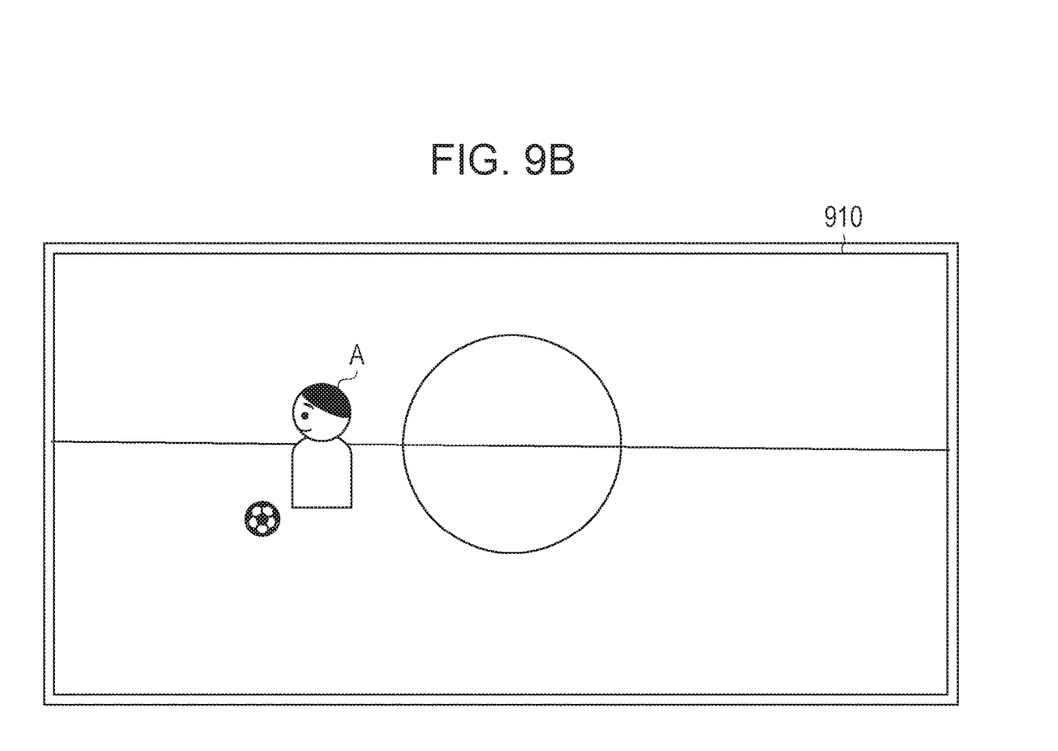

FIG. 9A is a diagram illustrating the first virtual viewpoint image. FIG. 9B is a diagram illustrating the second virtual viewpoint image relative to the first virtual viewpoint image illustrated in FIG. 9A. When the first virtual viewpoint shifts in accordance with a user operation, a player A may be out of a frame of a first virtual viewpoint image 900 as illustrated in FIG. 9A. In this case, when the user inputs an instruction for switching of a virtual viewpoint, a second virtual viewpoint image 910 illustrated in FIG. 9B is generated in step S606, and the terminal device 130 displays the second virtual viewpoint image 910. By this, the user may continue to see the player A within the displayed field of view without a complicated operation. Furthermore, since the second virtual viewpoint is determined based on the first virtual viewpoint, the image generation apparatus 120 may perform the switching of a viewpoint without the user experiencing a feeling of strangeness.

Referring back to FIG. 6, in step S608, the image generator 404 determines whether the first virtual viewpoint has been changed in accordance with a user operation performed using the terminal device 130. When the determination is affirmative (Yes in step S608), the image generator 404 returns to step S601. In this case, in a process from step S601 onwards, a first virtual viewpoint image corresponding to a frame following the preceding first virtual viewpoint image is generated.

When the determination is negative (No in step S608), the image generator 404 proceeds to step S609. In step S609, the image generator 404 generates a first virtual viewpoint image corresponding to a frame following the preceding first virtual viewpoint image. In step S610, the communication processor 401 transmits the first virtual viewpoint image generated in step S609 to the terminal device 130. Thereafter, the process returns to step S605.

As described above, even in a state in which a subject is out of a frame, the image processing system 100 of the first embodiment may provide an appropriate virtual viewpoint image. Furthermore, the image processing system 100 may perform the switching of a viewpoint in an image displayed on the screen 132 of the terminal device 130 without the user experiencing a feeling of strangeness. Furthermore, since the image generation apparatus 120 determines a second virtual viewpoint in advance before receiving the switching instruction, a second virtual viewpoint image may be generated and transmitted immediately after the reception of the switching instruction.

As a modification of the first embodiment, the image processing system 100 may generate a second virtual viewpoint image having an angle of view which is larger than that of a first virtual viewpoint image instead of the change of a virtual viewpoint from the first virtual viewpoint to a rear position of the first virtual viewpoint. Specifically, in this case, the image processing system 100 determines the angle of view of the second virtual viewpoint image based on the angle of view of the first virtual viewpoint image. Note that the image processing system 100 determines that the angle of view of the second virtual viewpoint image is larger than that of the first virtual viewpoint image. Then the second virtual viewpoint image is generated based on the determined angle of view and a virtual viewpoint of the first virtual viewpoint image. Furthermore, the image processing system 100 may generate a second virtual viewpoint image by changing both of a virtual viewpoint and an angle of view.

Second Embodiment

Figure 10:
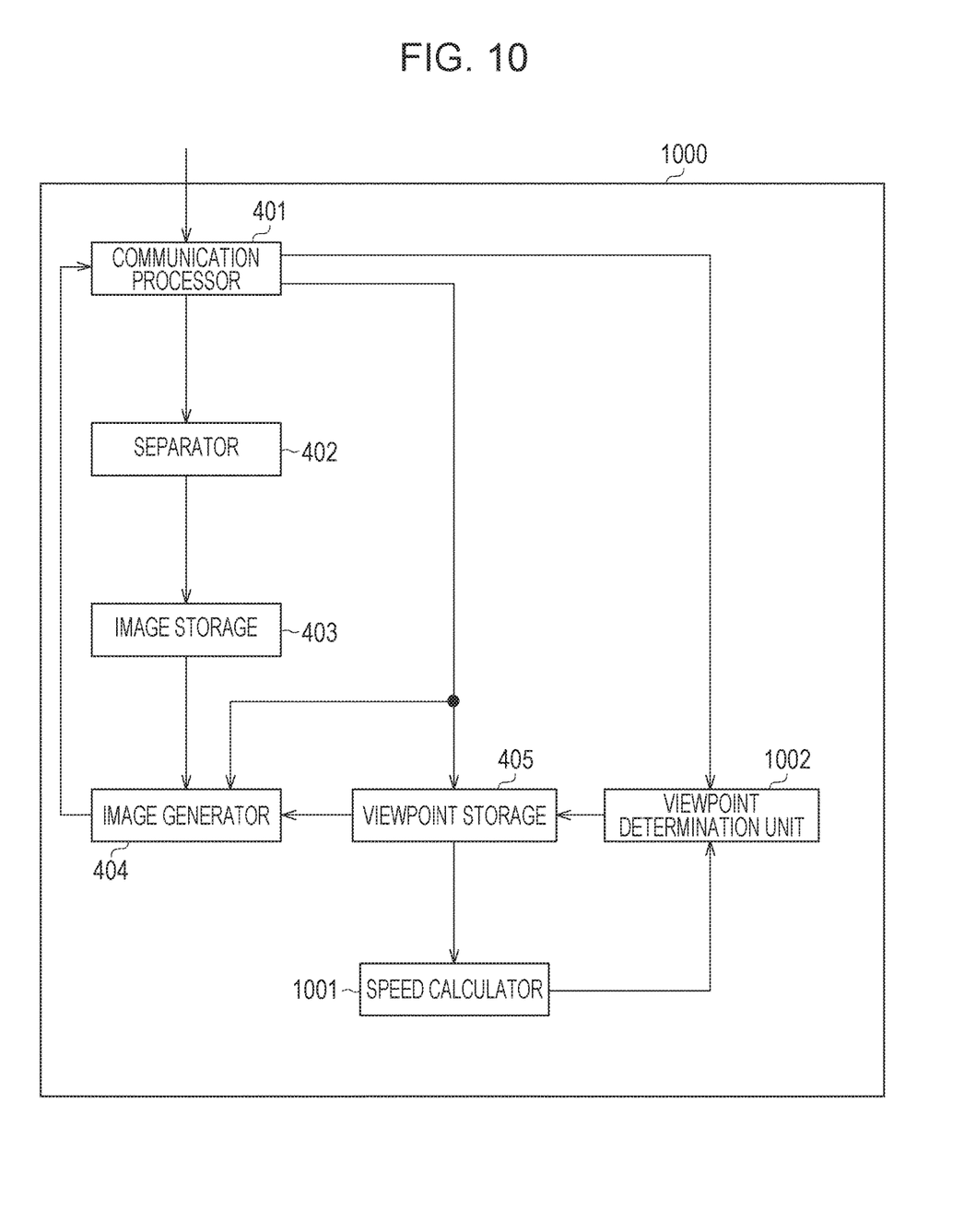
FIG. 10 is a diagram illustrating a functional configuration of an image generation apparatus according to a second embodiment.

Next, an image processing system according to a second embodiment will be described with respect to a portion of the image processing system different from the image processing system according to the first embodiment. The image processing system of the second embodiment is different from that of the first embodiment in a functional configuration of an image generation apparatus. FIG. 10 is a diagram illustrating a functional configuration of the image generation apparatus according to the second embodiment. An image generation apparatus 1000 further includes a speed calculator 1001 in addition to the functional configuration of the image generation apparatus 120. The speed calculator 1001 calculates a moving speed of a first virtual viewpoint indicated by first virtual viewpoint information input to a communication processor 401. Thereafter, the speed calculator 1001 supplies the relationship between the calculated moving speed and a reference speed set in advance as a speed coefficient to a viewpoint determination unit 1002.

The viewpoint determination unit 1002 determines a position of a second virtual viewpoint based on the first virtual viewpoint and the speed coefficient. In a case of a movement of 20 meters in a positive direction of an X axis per 1 second, a moving speed is 20 meters per second. When the reference speed is 10 meters per second, if the moving speed is 20 meters per second, a speed is increased twice, and therefore, a speed coefficient is 2. In this embodiment, the viewpoint determination unit 1002 determines a position shifted rearward by a distance obtained by multiplying the reference distance of 10 meters by the speed coefficient as a second virtual viewpoint. Accordingly, the viewpoint determination unit 1002 determines a position shifted rearward by 20 meters relative to the first virtual viewpoint as a second virtual viewpoint in the case where the speed coefficient is 2. Note that other configurations and other processes of the image processing system according to the second embodiment are the same as those of the image processing system according to the first embodiment.

Accordingly, in the image processing system according to the second embodiment, a position of a second virtual viewpoint is determined in accordance with a moving speed of a first virtual viewpoint. Accordingly, even in a case where a moving speed of a first virtual viewpoint is high, a second virtual viewpoint may be determined such that a specific subject is not out of a frame of the field of view of the second virtual viewpoint.

Third Embodiment

Figure 11:
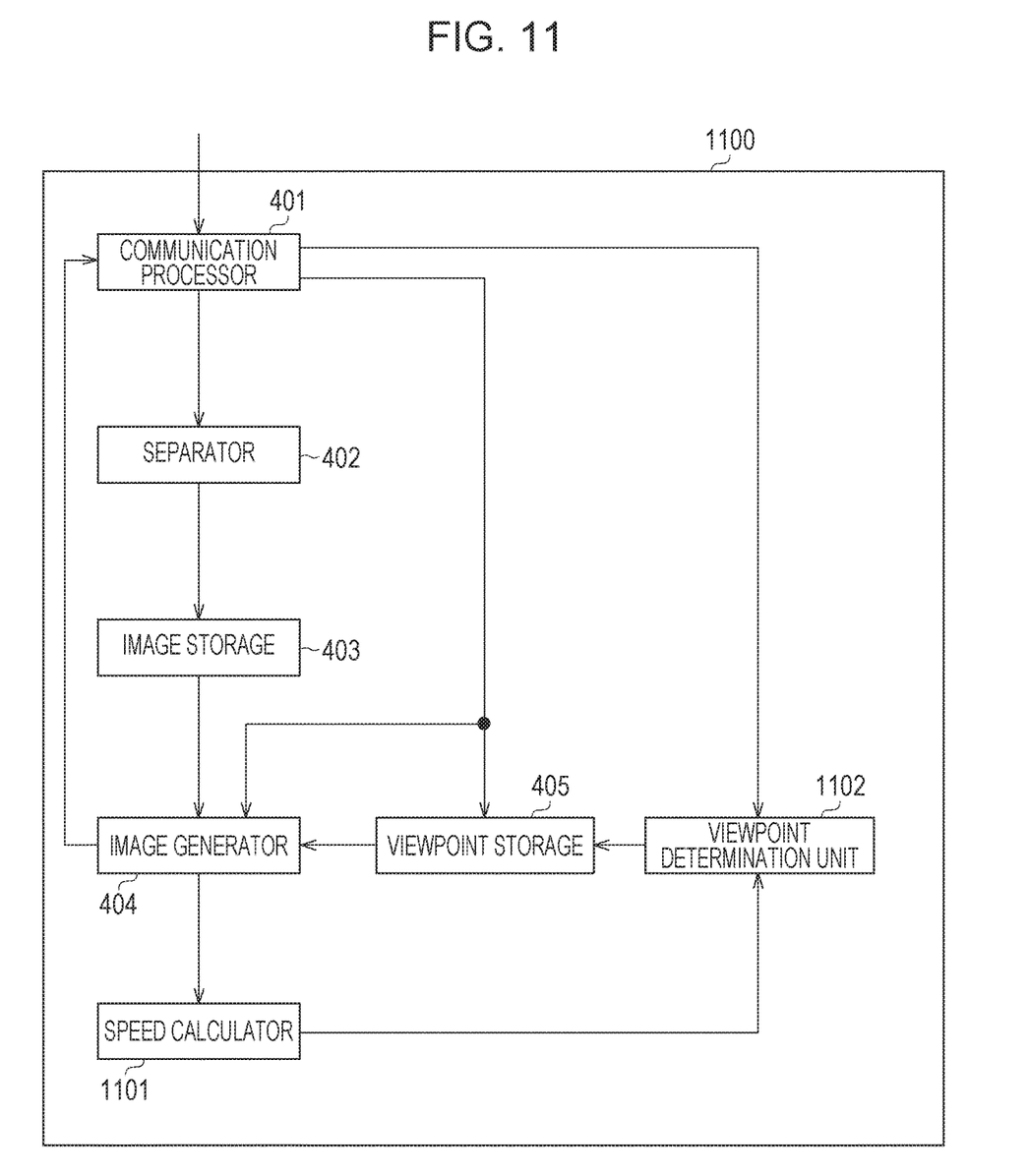
FIG. 11 is a diagram illustrating a functional configuration of an image generation apparatus according to a third embodiment.

Next, an image processing system according to a third embodiment will be described with respect to a portion of the image processing system different from the image processing systems according to the first and second embodiments. The image processing system of the third embodiment is different from those of the first and second embodiments in a functional configuration of an image generation apparatus. FIG. 11 is a diagram illustrating a functional configuration of an image generation apparatus 1100 according to the third embodiment. The image generation apparatus 1100 includes a speed calculator 1101 in addition to the functional configuration of the image generation apparatus 120.

The speed calculator 1101 calculates a moving speed of a subject in a first virtual viewpoint image generated by an image generator 404. The speed calculator 1101 calculates the moving speed based on the first virtual viewpoint image. Note that a process of obtaining the moving speed is not limited to that described with respect to this embodiment as long as the speed calculator 1101 obtains the moving speed. As another example, in a case where the subject is a player, the image generation apparatus 1100 may directly receive speed data detected by a movement detection sensor which is directly attached to the player. The speed calculator 1101 supplies the relationship between the calculated moving speed and a reference speed set in advance as a speed coefficient to a viewpoint determination unit 1102.

The viewpoint determination unit 1102 determines a position of a second virtual viewpoint based on a first virtual viewpoint and the speed coefficient. Note that a process performed by the viewpoint determination unit 1102 is the same as that of the viewpoint determination unit 1002 according to the second embodiment. Note that other configurations and other processes of the image processing system according to the third embodiment are the same as those of the image processing systems according to the first and second embodiments.

As described above, in the image processing system according to the third embodiment, a position of a second virtual viewpoint is determined in accordance with a moving speed of a subject. Accordingly, even in a case where the moving speed of the subject is high, a second virtual viewpoint may be determined such that a specific subject is not out of a frame of the field of view of the second virtual viewpoint.

As a modification of this embodiment, an image processing system may obtain a speed coefficient based on two moving speeds, that is, a moving speed of a first virtual viewpoint and a moving speed of a subject and determine a second virtual viewpoint based on the speed coefficient. Furthermore, the image processing system may determine a second virtual viewpoint when at least one of the moving speed of the first virtual viewpoint and the moving speed of the subject becomes a predetermined speed. Furthermore, the image processing system may generate and display a virtual viewpoint image such that a virtual viewpoint is gradually shifted from a first virtual viewpoint to a second virtual viewpoint. Furthermore, although the image processing system specifies the first virtual viewpoint in accordance with a user operation, the first virtual viewpoint may be determined based on a position of a subject as another example.

Exemplary embodiments of the present technique have been described hereinabove. The present technique is not limited to the specific embodiments, however, and various modifications and various changes may be made without departing from the scope of the present technique described in Claims.

Other Embodiments

The present technique may be realized by a process of supplying programs which realize at least one of the functions of the foregoing embodiments to a system or an apparatus through a network or a storage medium and reading and executing the programs using at least one processor included in a computer of the system or the apparatus. Furthermore, the present technique may be realized by a circuit which realize at least one of the functions (an application specific integrated circuit (ASIC)).

According to this embodiment, the possibility that the user who sets a virtual viewpoint misses seeing a specific subject may be reduced.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-170929 filed Sep. 1, 2016 which is hereby incorporated by reference herein in its entirety.

What is claimed is:

1. An image processing apparatus comprising:
an obtaining unit configured to obtain an image generated based on a set virtual viewpoint and images captured by a plurality of image capturing apparatuses from different directions;
a receiving unit configured to receive an instruction for switching a virtual viewpoint, the instruction being an instruction not specified by a user in terms of a position and a direction of a virtual viewpoint; and
a display control unit configured to cause
a display unit to display, based on the instruction received by the receiving unit while a first image corresponding to a first virtual viewpoint is displayed on the display unit, a second image corresponding to a second virtual viewpoint a position of which is separated from a position of the first virtual viewpoint by a predetermined distance in a direction opposite to a direction of the first virtual viewpoint, a range displayed in the second image corresponding to the second virtual viewpoint including a range displayed in the first image corresponding to the first virtual viewpoint and being larger than the range displayed in the first image corresponding to the first virtual viewpoint.

2. The image processing apparatus according to claim 1, wherein the position of the second virtual viewpoint has a predetermined positional relationship with the position of the first virtual viewpoint.

3. The image processing apparatus according to claim 2, wherein the receiving unit receives an input regarding a predetermined positional relationship.

4. The image processing apparatus according to claim 2, wherein the second virtual viewpoint is based on the predetermined positional relationship and a moving speed of the first virtual viewpoint.

5. The image processing apparatus according to claim 2, wherein the second virtual viewpoint is based on the predetermined positional relationship and a moving speed of a specific subject included in the first image.

6. The image processing apparatus according to claim 1, wherein the display control unit displays the second image corresponding to the second virtual viewpoint and does not display the first image corresponding to the first virtual viewpoint after the instruction is received by the receiving unit.

7. The image processing apparatus according to claim 1, wherein the display control unit displays the first image corresponding to the first virtual viewpoint and the second image corresponding to the second virtual viewpoint after the instruction is received by the receiving unit.

8. An image processing method, comprising:
obtaining an image generated based on a set virtual viewpoint and images captured by a plurality of image capturing apparatuses from different directions;
receiving an instruction for switching a virtual viewpoint, the instruction being an instruction not specified by a user in terms of a position and a direction of the virtual viewpoint; and
displaying on a display unit,
based on the instruction received while a first image corresponding to a first virtual viewpoint is displayed on the display unit, a second image generated based on the images captured by the plurality of image capturing apparatuses and a second virtual viewpoint a position of which is separated from a position of the first virtual viewpoint by a predetermined distance in a direction opposite to a direction of the first virtual viewpoint is displayed on the display unit, a range displayed in the second image corresponding to the second virtual viewpoint including a range displayed in the first image corresponding to the first virtual viewpoint and being larger than the range displayed in the first image corresponding to the first virtual viewpoint.

9. A non-transitory computer-readable storage medium which stores a computer program for causing a computer to execute an image processing method, the image processing method comprising:

obtaining an image generated based on a set virtual viewpoint and images captured by a plurality of image capturing apparatuses from different directions;

receiving an instruction for switching a virtual viewpoint, the instruction being an instruction not specified by a user in terms of a position and a direction of the virtual viewpoint; and displaying on a display unit, based on the instruction is received while a first image corresponding to a first virtual viewpoint is displayed on the display unit, a second image corresponding to a second virtual viewpoint a position of which is separated from a position of the first virtual viewpoint by a predetermined distance in a direction opposite to a direction of the first virtual viewpoint is displayed on the display unit, a range displayed in the second image corresponding to the second virtual viewpoint including a range displayed in the first image corresponding to the first virtual viewpoint and being larger than the range displayed in the first image corresponding to the first virtual viewpoint.

10. An image processing apparatus comprising:

a generating unit configured to generate an image based on a set virtual viewpoint and images captured by a plurality of image capturing apparatuses from different directions;

a determination unit configured to determine whether an instruction for switching a virtual viewpoint is received, the instruction being an instruction not specified by a user in terms of a position and a direction of the virtual viewpoint; and a transmitting unit configured to transmit to a display unit, based on the determination by the determination unit that the instruction is received while a first image which corresponds to a first virtual viewpoint and is generated by the generating unit is displayed on the display unit, a second image which corresponds to a second virtual viewpoint a position of which is separated from a position of the first virtual viewpoint by a predetermined distance in a direction opposite to a direction of the first virtual viewpoint and is generated by the generating unit, a range displayed in the second image corresponding to the second virtual viewpoint including a range displayed in the first image corresponding to the first virtual viewpoint and being larger than the range displayed in the first image corresponding to the first virtual viewpoint.

\* \* \* \* \*